United States Patent [19]
Boyer

[11] Patent Number: 5,912,965
[45] Date of Patent: Jun. 15, 1999

[54] TELEPHONE SET WHICH CAN BE ADJUSTED IN RESPONSE TO AMBIENT NOISE

[75] Inventor: Jean-Philippe Boyer, Boulogne, France

[73] Assignee: U.S. Philips Corporation, New York, N.Y.

[21] Appl. No.: 08/749,446

[22] Filed: Nov. 15, 1996

[30] Foreign Application Priority Data

Nov. 22, 1995 [FR] France .................................. 95 13866

[51] Int. Cl.⁶ .................................................. H04M 1/60
[52] U.S. Cl. ........................... 379/390; 379/410; 381/107
[58] Field of Search ...................... 379/387, 388, 379/390, 391, 392, 406, 409, 410, 411; 381/101, 102, 104, 105, 106, 107, 108

[56] References Cited

U.S. PATENT DOCUMENTS

| 4,507,524 | 3/1985 | Yun ......................................... | 379/387 |
| 4,829,565 | 5/1989 | Goldberg ................................. | 379/390 |
| 5,732,390 | 3/1998 | Katayanagi et al. .................... | 704/227 |

FOREIGN PATENT DOCUMENTS

0682437A2  11/1995  European Pat. Off. ......... H04M 9/08

2250455  10/1990  Japan .............................. H04M 1/60

OTHER PUBLICATIONS

Apr. 27–30 1993 International Conference on Acoustics, Speech and Signal Processing, "Frequency domain noise suppression approaches in mobile telephone systems", Jun Yang, Minneapolis.

*Primary Examiner*—Fan S. Tsang
*Attorney, Agent, or Firm*—Jack D. Slobod

[57] ABSTRACT

A telephone set includes transmitting parts (M, 131, 132) which enable a speaker to send a voice message to a correspondent, receiving parts (E, 132, 133) which enable the speaker to receive a return voice message coming from the correspondent and circuitry (11, 12, 16) which permit the sound volume of the return voice message supplied to the speaker via the receiving means to be adapted as a function of a sound volume of ambient noise locally surrounding the speaker. The adaptation circuitry includes a fuzzy logic section (14, 15) which receives measurements of a breathing noise caused by the speaker and measurements of the speech signal and of the ambient noise, and produces a control signal (COM) for monitoring the sound volume of the return voice message sent to the speaker.

4 Claims, 2 Drawing Sheets

TELEPHONE SET WHICH CAN BE ADJUSTED IN RESPONSE TO AMBIENT NOISE

FIELD OF THE INVENTION

The invention relates to a telephone set comprising transmitting means which enable a speaker to send a voice message to a correspondent and receiving means which enable the speaker to receive a return voice message coming from the correspondent.

BACKGROUND OF THE INVENTION

It is the purpose of a telephone set to permit the transportation of speech over a distance by means of electric signals. At the transmitting end, the telephone set carries out a transformation of acoustic signals into electric signals. At the receiving end, the telephone set carries out the transformation of the electric signals into acoustic signals. The structure of a telephone set is well known. It comprises transducing elements for transforming the acoustic energy into electrical energy and vice versa, adapting elements for adapting to a transmission line and signaling and dialing elements. These elements are spread over a handset and a base station. Generally, the handset comprises the transducers, that is to say, a microphone and an earphone, and the base station comprises the other elements.

When two subscribers communicate with each other (referenced speaker and correspondent hereafter), there are a signaling phase and a conversation phase proper. During a conversation, the speaker may express himself in a sound environment which is more or less noisy. This noise is then transmitted to the correspondent by the telephone channel and will annoy the correspondent. Various techniques for eliminating the ambient noise of the signal to be transmitted have been described, for example, in the document entitled: "Frequency domain noise suppression approaches in mobile telephone systems", Jin Yang, IEEE International Conference on Acoustics, Speech and Signal Processing, Minneapolis, Apr. 27–30, 1993. But this does not resolve the problem of the speaker who is annoyed by the ambient noise around him. In effect, when the speaker receives the words sent by the correspondent, if the noise surrounding the speaker becomes heavy, the speaker can experience difficulties understanding the words of his correspondent.

SUMMARY OF THE INVENTION

It is an object of the invention to permit the speaker to understand the words of his correspondent better even if the noise surrounding the speaker becomes heavy.

This object is achieved with a telephone set that comprises means for adapting a sound volume of the return voice message sent to the speaker via the receiving means, as a function of an ambient noise sound volume locally perceived by the speaker.

For realizing this adaptation, the telephone set detects the instants at which the speaker expresses himself, while detecting, on the one hand, an effect of breath caused by the small distance commonly separating the speaker's mouth and the microphone and, on the other hand, while detecting the presence of word bursts which form a conversation. The level of noise surrounding the speaker is also detected. In this manner it is possible to determine the instants at which the speaker expresses himself and the instants at which he does not express himself, that is to say, during which the correspondent has every chance of expressing himself.

When the speaker does not express himself, the adapting means measure the sound volume of the sound surrounding the speaker and, in consequence, adapt the sound volume of the correspondent's voice message returned to the speaker. All these information signals are processed in combination in one or various fuzzy logic units which produce a control signal which monitors the signal of the voice message sent to the earphone.

Therefore, the means for adapting the sound volume comprise:

- a first section for producing a first signal which is a measure of a breathing sound produced by the speaker while expressing himself in the transmission means,
- a second section for producing, on the one hand, a second signal which is a measure of noise level surrounding the speaker and, on the other hand, a third signal which is a measure of an appearance or interruption of the speaker's voice message, and
- a fuzzy logic third section for receiving the first, second and third signals, and for delivering a control signal applied to the receiving means to adapt, during the interruptions of the speaker's voice message, the correspondent's voice message returned to the speaker, as a function of the ambient noise sound volume locally perceived by the speaker.

BRIEF DESCRIPTION OF THE DRAWING

These and other aspects of the invention will be apparent from and elucidated with reference to the embodiments described hereinafter.

In the drawings.

DESCRIPTION OF EMBODIMENTS

Figure 1:
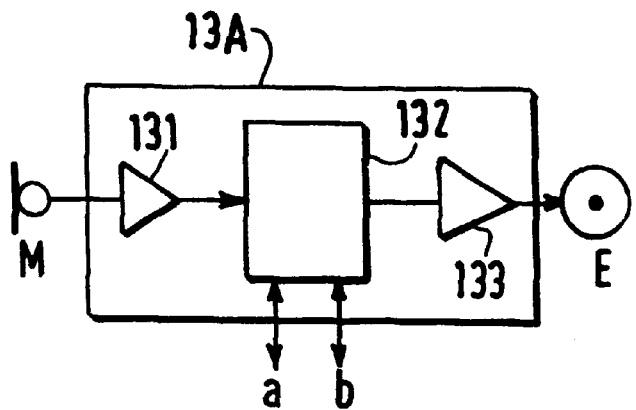
FIG. 1 shows a general circuit diagram of a known telephone set.

FIG. 1 shows a telephone set comprising a microphone M, an earphone E and a base station 13A connected to a transmission line a,b. Generally, various operating means are concentrated in the base station 13A. The latter more particularly comprises in a sub-unit 132, line access elements, interface circuits for ensuring two-way communications, ringing elements and dialing elements. The electric signal supplied via the microphone M is amplified by an amplifier 131. The electric signal relating to the return voice message coming from the correspondent is amplified in an amplifier 133 to be fed to the earphone E.

Figure 2:
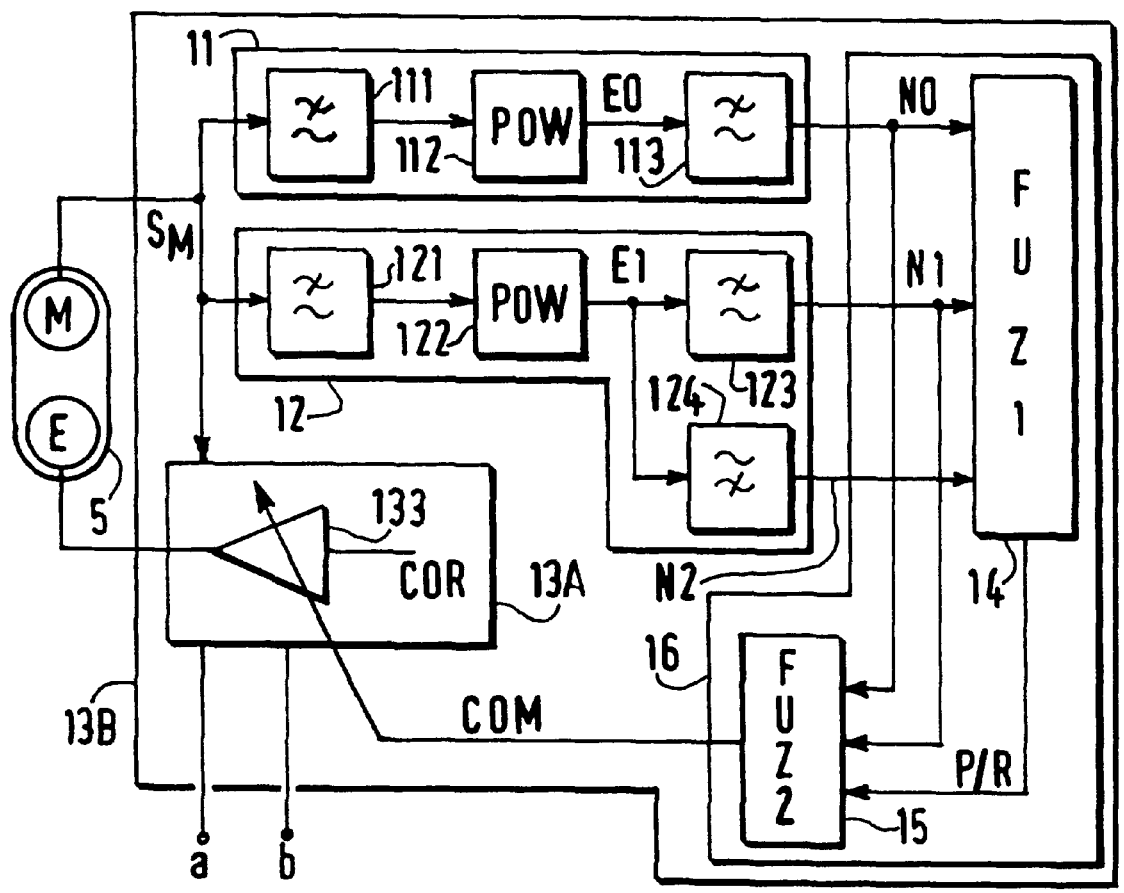
FIG. 2 shows a diagram of a telephone set according to the invention.

FIG. 2 shows a telephone set according to the invention. The microphone M and the earphone E are grouped here in a handset 5. The base station 13B comprises the elements of the base station 13A already described to which are added those of the invention. For implementing the invention, the electric signal $S_M$ coming from the microphone, amplified as required, is processed separately by two sections to analyze the composition and the evolution of the speaker's voice message. The signal $S_M$ enters, on the one hand, a first section 11 which measures the effect of breath produced by the speaker's words in the microphone and, on the other hand, a second section 12, which measures the appearance or interruption of the speaker's words as well as the level of noise surrounding the speaker.

The first section comprises in a series combination a low-pass filter 111 which eliminates the high-frequency components from the signal supplied by the microphone and saves only the components which have a very low frequency (for example, a passband from about 10 to 100 Hz). A circuit POW 112 measures in a given analysis period the energy EO of the filtered signal coming from filter 111. The power signal EO is in its turn filtered for eliminating therefrom the high-frequency components by means of a filter 113 which produces a signal NO that characterizes the effect of breath produced by the speaker's words in the microphone.

The second section comprises in a series combination a bandpass filter 121 (for example, a bandpass from about 200 Hz to 1 kHz) which measures the noise level, while saving the voice frequency components contained in the signal produced by the microphone. A circuit POW 122 measures over a given analysis period the power E1 of the filtered signal coming from the filter 121. The energy signal E1 is in its turn filtered for eliminating therefrom the high-frequency components by means of the filter 123 which produces a signal N1 that characterizes the level of noise surrounding the speaker.

The power signal E1 is also filtered by a high-pass filter 124 which detects transitions of the power signal E1 to detect the instants at which the speaker's voice message appears or is interrupted. The filter 124 produces a signal N2 which represents the transitions of the signal $S_M$ in the time domain that characterizes word bursts.

It is possible to subdivide the passband processed by the second section into several frequency sub-bands to discriminate a noise level in each frequency sub-band. The means of the second section are thus duplicated.

The signals N0, N1, N2 enter a fuzzy logic unit 16 formed by a sub-unit 14 FUZ1 and a sub-unit 15 FUZ2. In each analysis period, the sub-unit FUZ1 produces a binary signal P/R whose logic state indicates whether it is a speech signal coming from the speaker (P/R=1) or whether it is not a speech signal coming from the speaker (P/R=0). In the latter case, according to the invention, first there is considered that the speaking time of the correspondent is concerned, and secondly that the microphone M detects the sound volume of ambient noise that surrounds the speaker. This may be noise of any kind and notably of conversations held close to the speaker. Nevertheless, by taking into account the effect of breath produced or not by the speaker, the adaptation means discriminate between the voice of the speaker and the conversations held close to him by other persons. The data of the effect of breath contained in the signal N0 are combined with the signal N1 and with the signal P/R in the fuzzy logic sub-unit 15 FUZ2 to obtain a control signal COM. The sub-unit FUZ2 may take into account the switching frequency of the signal P/R. The volume of the correspondent's voice message COR which arrives by the line a,b is then adapted as a function of the sound volume of the ambient noise locally perceived by the speaker. Therefore, use is made of the variable amplifier 133 controlled by the control signal COM to monitor the level of the electric signal fed to the earphone. The control signal COM is adapted on the basis of the absence of speech from the speaker. When the speaker speaks, preferably the control signal resulting from the previous adjustment remains unchanged.

Figure 3:
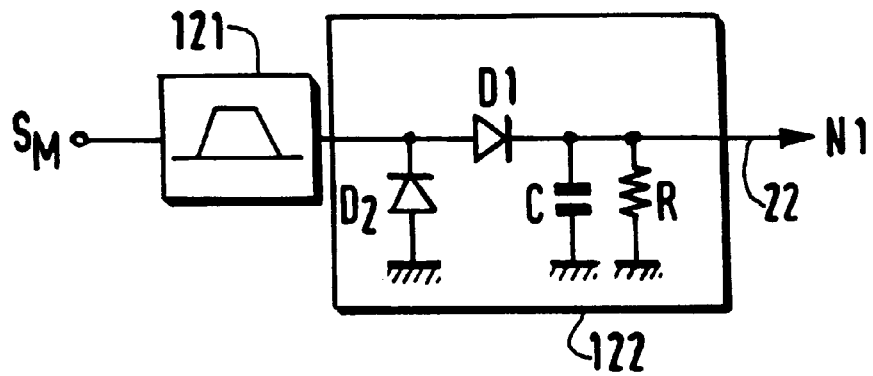
FIG. 3 shows a diagram of a selective detection stage for sound energy.

FIG. 3 represents a circuit 122 for measuring the power of a signal, for example, the signal on the output of the filter 121. The circuit 122 comprises a diode D1 connected in forward direction between the output of the filter 121 and an output 22 of the circuit 122, a diode D2 connected in reverse-sense between the output of the filter 121 and a reference potential (ground), an integration cell formed by a capacitor C in a parallel combination with a resistor R connected between the output 22 and the reference potential (ground). The signal N1 on the output 22 represents the measurement of the energy of the input signal $S_M$ in the range of frequencies selected by the filter 121, that is to say, the level of noise when the speaker does not speak. Any other array performing the same function is suitable.

Figure 4:
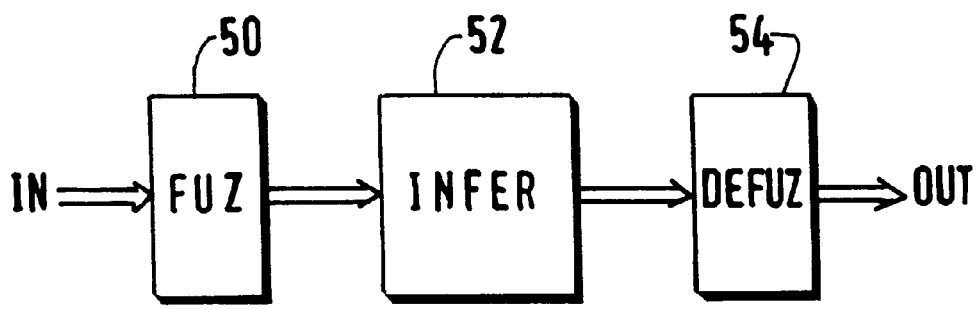
FIG. 4 shows a basic circuit diagram of a fuzzy logic monitoring unit.
Figure 5:
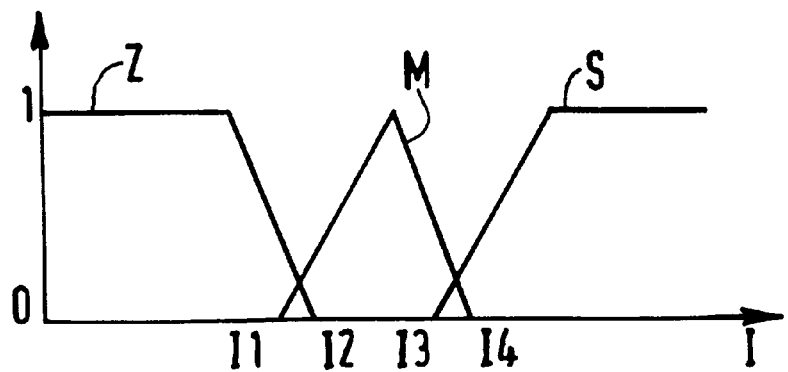
FIG. 5 is a representation of examples of fuzzy sets.

The FIGS. 4 and 5 provide a simple recollection of the essential principles of fuzzy logic.

The basic operations known of fuzzy logic are shown in a diagram in FIG. 4 in which a module 50 FUZ is shown which performs a fuzzification of the input signal IN, a module INFER 52 which applies inference rules and a module DEFUZ 54 which carries out a defuzzification of the data and which produces a signal OUT. These operations are realized in the sub-units FUZ1 and FUZ2 according to the invention.

FIG. 5 forms an example of fuzzy sets which relate to a variable, for example, the signal N1 which measures the noise level surrounding the speaker. The following fuzzy sets are defined (where I is a current input variable):

set Z corresponding to a zero noise signal when I<I2, set M corresponding to a medium noise signal when I1<I<I4, set S corresponding to a heavy noise signal when I>I3.

All the components N0, N1, N2 are thus translated in the same manner into fuzzy sets which are stored in the fuzzy unit FUZ1. Also stored there are inference rules of the type:

If NO is medium and if N1 is high and if N2 is medium, P/R is equal to 1.

In the working mode, a current input data I=N0, N1 or N2 could belong to one or various fuzzy sets depending on various degrees of association. The inference rules mentioned above are then applied to these data to derive therefrom each time a derived value for the signal P/R. From all the derived values is extracted a signal P/R that is compatible with all the derived values. The latter operation is called defuzzification.

The second unit FUZ2 has a similar effect on the signals P/R, NO and N1. The output of the unit FUZ2 produces the control signal COM which controls the amplifier 133 to adjust the sound volume supplied via the earphone.

I claim:

1. A telephone set comprising:
    transmitting means which enable a speaker to send a voice message to a correspondent,
    receiving means which enable the speaker to receive a return voice message coming from the correspondent, and
    control means for forming a first measure of a breathing sound produced by the speaker, a second measure of the appearance or interruption of the speaker's voice, and a third measure of noise level, and for adapting the sound volume of the return voice message supplied to the speaker via the receiving means as a function of the formed first, second, and third measures.

2. A telephone set comprising transmitting means which enable a speaker to send a voice message to a correspondent, receiving means which enable the speaker to receive a return voice message coming from the correspondent, and means for adapting the sound volume of the return voice message supplied to the speaker via the receiving means as a function of an ambient noise sound volume locally perceived by the speaker, said means for adapting the sound volume comprising:

- a first section for producing a first signal which is a measure of a breathing sound produced by the speaker while expressing himself in the transmission means,
- a second section for producing, on the one hand, a second signal which is a measure of a noise level surrounding the speaker and, on the other hand, a third signal which is a measure of an appearance or interruption of the speaker's voice message, and
- a fuzzy logic third section for receiving the first, second and third signals, and for delivering a control signal applied to the receiving means to adapt, during the interruptions of the speaker's voice message, the correspondent's voice message returned to the speaker, as a function of the ambient noise sound volume locally perceived by the speaker.

3. The telephone set as claimed in claim 1, wherein the control means comprises measuring means for forming said first, second, and third measures, and fuzzy logic means for forming a sound volume control signal as a function of the formed first, second, and third measures.

4. The telephone set as claimed in claim 3, wherein said fuzzy logic means comprises a first section for forming in response to the first, second, and third measures, a logic state indicating whether or not a speech signal is coming from the speaker, and a second section for forming said sound volume control signal in response to said first and second measures and said logic state.

* * * * *